United States Patent
Powell et al.

(10) Patent No.: US 11,597,289 B2
(45) Date of Patent: Mar. 7, 2023

(54) ELECTRIFIED VEHICLE CONTROL OF BI-DIRECTIONAL DC/DC CONVERTER FOR HIGH VOLTAGE POWER ASSIST FROM LOW VOLTAGE SYSTEM

(71) Applicant: FORD GLOBAL TECHNOLOGIES, LLC, Dearborn, MI (US)

(72) Inventors: Stephen Thomas Powell, Auburn Hills, MI (US); Lars Niklas Pettersson, Novi, MI (US); Patrick Gordon Collins, Canton, MI (US); Marin Assaliyski, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 269 days.

(21) Appl. No.: 16/938,570

(22) Filed: Jul. 24, 2020

(65) Prior Publication Data
US 2022/0024332 A1    Jan. 27, 2022

(51) Int. Cl.
| B60L 53/22 | (2019.01) |
| F02N 11/08 | (2006.01) |
| B60L 1/00 | (2006.01) |
| B60L 50/60 | (2019.01) |

(52) U.S. Cl.
CPC .............. *B60L 53/22* (2019.02); *B60L 1/003* (2013.01); *B60L 50/66* (2019.02); *F02N 11/08* (2013.01)

(58) Field of Classification Search
CPC ........... B60L 53/22; B60L 50/66; F02N 11/08
See application file for complete search history.

(56) References Cited

U.S. PATENT DOCUMENTS

| 6,344,985 B1 | 2/2002 | Akerson |
| 7,057,376 B2 | 6/2006 | Cook et al. |
| 7,857,081 B2 | 12/2010 | Kishimoto |
| 2010/0006360 A1* | 1/2010 | Kishimoto ............ B60K 6/547 180/65.21 |
| 2018/0102702 A1* | 4/2018 | Ahn ........................ B60L 53/22 |

FOREIGN PATENT DOCUMENTS

EP          2 393 196 B1       9/2014

* cited by examiner

*Primary Examiner* — Jared Fureman
*Assistant Examiner* — Duc M Pham
(74) *Attorney, Agent, or Firm* — Brooks Kushman PC; David Kelley

(57) ABSTRACT

A vehicle and control method include a traction battery having a first nominal voltage, an auxiliary battery having a second nominal voltage, a bi-directional voltage converter configured to convert voltage between the first nominal voltage and the second nominal voltage, an electric machine powered by the traction battery and configured to provide propulsive power to the vehicle, an internal combustion engine, a plurality of electric accessories, and a controller programmed to control the DC/DC converter and the electric machine to supply power from the auxiliary battery through the DC/DC converter to the electric machine for a specified period of time in response to electric machine power demand being between a first threshold and a second threshold, and to reduce power supplied to at least one of the plurality of electric accessories in response to the electric machine power demand exceeding the second threshold.

17 Claims, 3 Drawing Sheets

ELECTRIFIED VEHICLE CONTROL OF BI-DIRECTIONAL DC/DC CONVERTER FOR HIGH VOLTAGE POWER ASSIST FROM LOW VOLTAGE SYSTEM

TECHNICAL FIELD

This disclosure relates to an electric vehicle and control strategy that control a bi-directional DC/DC converter to assist high/intermediate voltage devices using a lower voltage system.

BACKGROUND

Electrified vehicles may rely on a traction battery and electric machine to provide power for propulsion in addition to powering various vehicle components and accessories. Hybrid electric vehicles may also include an internal combustion engine to provide propulsion and to drive the electric machine and/or a dedicated generator to charge the traction battery, to charge an auxiliary battery, and/or to power various vehicle electrical loads. A DC/DC converter, buck/boost converter, or variable voltage converter (VVC) may be used to change the voltage provided from a source to a different voltage compatible with a particular electrical device or load.

Electrified vehicles subjected to a high road load situation in combination with high demand from auxiliary devices or components may exceed the ability of the electric machine to both propel the vehicle with the driver demanded torque and power all the auxiliary devices. For example, an electrified hybrid vehicle towing a trailer uphill on battery power with climate control, electric power steering, vehicle lights, infotainment system, etc. operating, and then requesting an engine start may exceed the ability of the electric machine to meet all the power demands. Power may be managed using load shedding strategies to temporarily disconnect or reduce power to lower priority electrical loads so that demands of higher priority electrical consumers are met. However, any noticeable reduction in vehicle or accessory performance may result in customer dissatisfaction.

SUMMARY

In various embodiments, an electrified vehicle and associated control method control a bi-directional DC/DC converter to provide power from a lower voltage system to service loads of a higher voltage system during high power demand from the electric machine.

In at least one embodiment, a vehicle includes a traction battery having a first nominal voltage, an auxiliary battery having a second nominal voltage lower than the first nominal voltage of the traction battery, a bi-directional DC/DC converter configured to convert voltage associated with the traction battery and the auxiliary battery between the first nominal voltage and the second nominal voltage, an electric machine powered by the traction battery and configured to provide propulsive power to the vehicle, and a controller configured to control the DC/DC converter and the electric machine to supply power from the auxiliary battery through the DC/DC converter to the electric machine for a specified period of time in response to electric machine power demand being between a first threshold and a second threshold. The vehicle may include a plurality of electric accessories powered by at least one of the auxiliary battery and the traction battery, wherein the controller is further configured to reduce power supplied to at least one of the electric accessories in response to the electric machine power demand exceeding the second threshold. The plurality of electric accessories may include an electric air conditioning compressor, wherein the controller is further configured to reduce the power supplied to the electric air conditioning compressor in response to the electric machine power demand exceeding the second threshold. In various embodiments, the vehicle may include an internal combustion engine, wherein the controller is configured to start the internal combustion engine using the electric machine in response to the electric machine power demand exceeding the first threshold. The vehicle may also include an on-board generator mechanically coupled to the internal combustion engine, wherein the controller is configured to reduce power to the generator in response to the electric machine power demand exceeding the second threshold. In one or more embodiments, the first nominal voltage exceeds 300V and the second nominal voltage is less than 50V.

Embodiments according to the disclosure may include a method for controlling a vehicle including an electric machine, a traction battery having a first nominal voltage, an auxiliary battery having a second nominal voltage, and a bi-directional voltage converter configured to convert voltage between the first nominal voltage and the second nominal voltage. The method may include operating the bi-directional voltage converter to supply power from the auxiliary battery to the electric machine in response to electric machine power demand exceeding a first threshold and reducing power supplied to at least one electrical load in response to the electric machine power demand exceeding a second threshold. The vehicle may further include an internal combustion engine and the method may further include starting the internal combustion engine in response to the electric machine power demand exceeding the first threshold. The first nominal voltage may exceed 300V and the second nominal voltage may be less than 50V. The vehicle may include an electric air conditioning compressor, wherein the method includes reducing power supplied to the electric air conditioning compressor in response to the electric machine power demand exceeding the first threshold. In various embodiments, the vehicle includes a generator mechanically coupled to the internal combustion engine and the method includes reducing power supplied by the generator.

Embodiments may include a vehicle having a traction battery with a first nominal voltage, an auxiliary battery with a second nominal voltage lower than the first nominal voltage of the traction battery, a bi-directional DC/DC converter configured to convert voltage associated with the traction battery and the auxiliary battery between the first nominal voltage and the second nominal voltage, an electric machine powered by the traction battery and configured to provide propulsive power to the vehicle, an internal combustion engine, a plurality of electric accessories, and a controller programmed to control the DC/DC converter and the electric machine to supply power from the auxiliary battery through the DC/DC converter to the electric machine for a specified period of time in response to electric machine power demand being between a first threshold and a second threshold, and to reduce power supplied to at least one of the plurality of electric accessories in response to the electric machine power demand exceeding the second threshold. The controller may be further programmed to start the internal combustion engine in response to the electric machine power demand exceeding at least one of the first and second thresholds. The plurality of electric accessories may include an electric air conditioning compressor. The vehicle may include an on-board generator mechanically coupled to the internal combustion engine. The electric machine may be configured to start the internal combustion engine. The controller may be further programmed to reduce power supplied to a sufficient number of the plurality of electric accessories to reduce the electric machine power demand below the second threshold.

Various embodiments may provide one or more advantages. For example, one or more embodiments may use a DC/DC converter to provide power from a low-voltage system to an intermediate-voltage or high-voltage system during high power demand on the electric machine to reduce load shedding that may otherwise adversely affect customer satisfaction.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one embodiment or illustrated individually in any of the figures can be combined with features illustrated in one or more other embodiments or figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
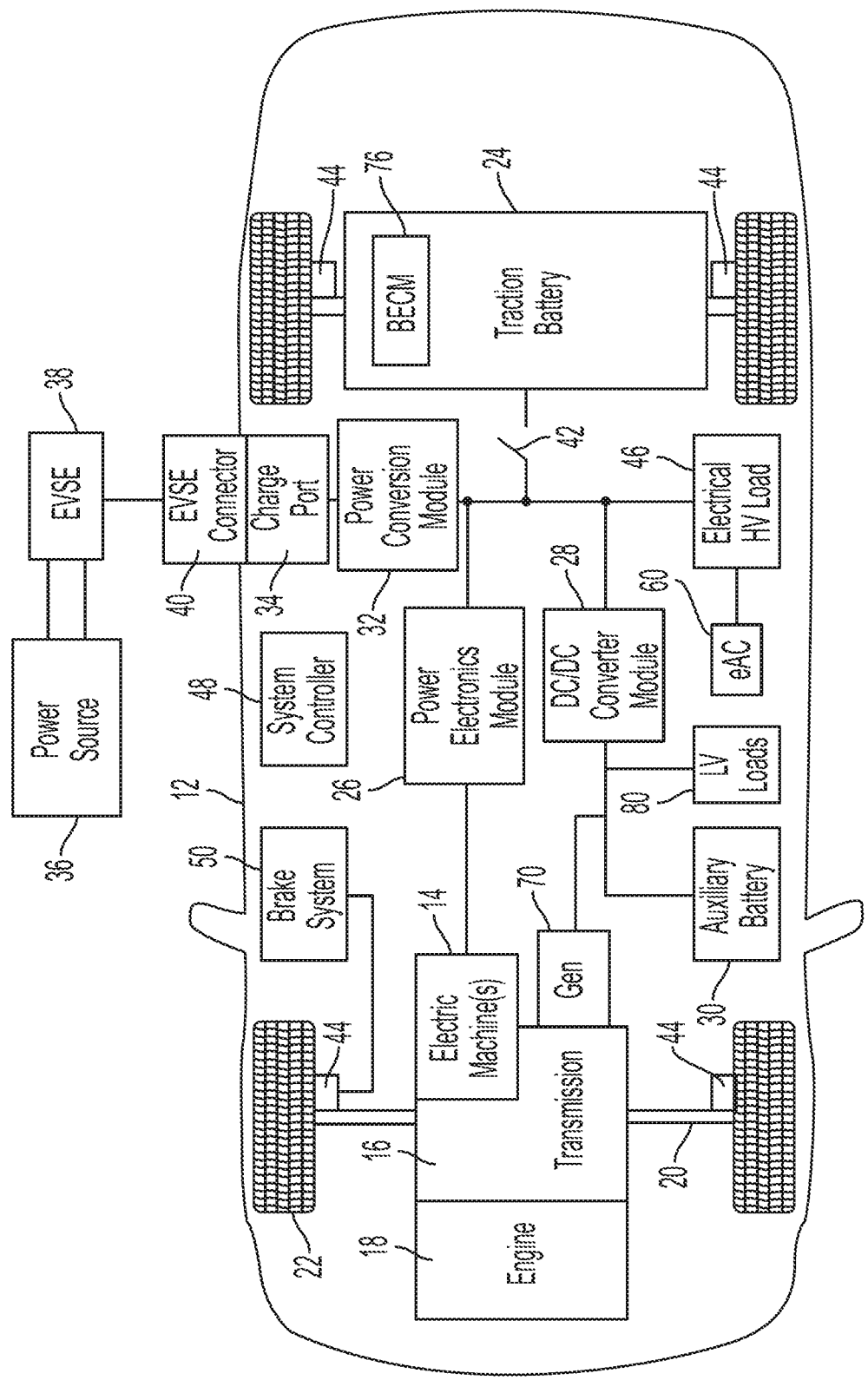
FIG. 1 is a diagram of a representative electrified vehicle implemented as a hybrid vehicle with an internal combustion engine providing power assist to a higher voltage system from a lower voltage system during high power demand.

FIG. 1 depicts a representative electrified vehicle, which is a plug-in hybrid electric vehicle (HEV) in this example. Vehicle 12 may comprise one or more electric machines 14 mechanically connected to a transmission 16. The electric machines 14 may be capable of operating as a motor or a generator. In addition, the transmission 16 is mechanically connected to an internal combustion engine 18. The transmission 16 is also mechanically connected to a drive shaft 20 that is mechanically connected to the wheels 22. The electric machines 14 can provide propulsion and regenerative braking capability when the engine 18 is turned on or off. During regenerative braking, the electric machines 14 act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. The transmission 16 may also be mechanically connected to one or more generators 70, i.e. electric machines operated exclusively as a generator.

A high-voltage traction battery or battery pack 24 stores energy that can be used by the electric machines 14. A vehicle battery pack 24 typically provides a high voltage (HV) DC output at a first nominal operating voltage, which may vary based on the particular application. In at least one embodiment, the first nominal operating voltage exceeds 300V. The nominal operating voltage may vary depending on the number and type of individual cells within the batter pack 24, as well as how the cells are connected to each other. The traction battery 24 is electrically connected to one or more power electronics modules. One or more contactors 42 may isolate the traction battery 24 from other components when opened and connect the traction battery 24 to other components when closed. A power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle, often referred to as a battery electric vehicle (BEV). For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems including high-voltage (HV) electrical loads and/or lower voltage (LV) electrical loads. A typical system may include a bi-directional DC/DC converter module 28 that converts the high voltage DC output of the traction battery 24 operating at the first nominal voltage to a lower voltage DC supply operating at a second nominal voltage that is compatible with other vehicle loads. The bi-directional operation of the DC/DC voltage converter module 28 may also be controlled by the system controller 48 to convert the second nominal voltage to the first nominal voltage. In at least one embodiment, the second nominal voltage is less than 50V. Various HV electrical loads 46, such as an electric air conditioning compressor 60 or an electric heater, for example, may be connected directly to the high-voltage side of the DC/DC converter module 28. The low-voltage (LV) systems may include various other electrical accessories or LV electrical loads 80 electrically connected to an auxiliary battery 30 (e.g., 12V or 48V battery).

The various components described may have one or more associated controllers to control and monitor the operation of the components. Each controller may include a microprocessor and associated non-transitory physical memory storing program instructions and data to perform the control functions. The controllers may communicate via a serial bus (e.g., Controller Area Network (CAN)), wirelessly, or via discrete conductors. In addition, a system controller 48 may be present to coordinate the operation of the various components. One or more of the HV electrical loads 46 and/or LV electrical loads 80 may be controlled by system controller 48 and/or a dedicated component controller in communication with one or more vehicle controllers via a vehicle communications network or bus to provide selective load shedding as described in greater detail herein. Load shedding may include controlling one or more electrical loads to disable operation or operate at a reduced power setting. For example, an electrical load having a fan operating at a high speed may be disabled or may be operated at a low speed or the fan may be disabled.

The electrified vehicle 12 may be an electric vehicle or a plug-in hybrid vehicle in which the traction battery 24 may be recharged by an external power source 36. The external power source 36 may be a connection to an electrical outlet powered by an electric grid or utility, for example. The external power source 36 may be electrically connected to electric vehicle supply equipment (EVSE) 38. The EVSE 38 may provide circuitry and controls to regulate and manage the transfer of energy between the power source 36 and the vehicle 12. In other embodiments, the vehicle 12 may employ wireless charging, which may be referred to as hands-free or contactless charging that uses inductive or similar wireless power transfer.

The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling as previously described.

One or more wheel brakes 44 may be provided for friction braking of the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components that are required to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 to achieve desired operation. The brake system 50 may respond to driver commands and may also operate autonomously to implement features such as stability control. The controller of the brake system 50 may implement a method of applying a requested brake force when requested by another controller or sub-function.

One or more electrical loads 46 may be connected to the high-voltage bus. The electrical loads 46 may have an associated controller that operates the electrical load 46 when appropriate. Examples of electrical loads 46 may be a heating module or an air-conditioning module, such as electric air-conditioning compressor (eAC) 60, for example.

A traction battery 24 may employ a variety of chemical formulations. Typical battery pack chemistries may be lead-acid, nickel-metal hydride (NIMH) or lithium-ion. Battery packs 24 may be composed of any number of individual battery cells connected in series or parallel or some combination thereof. A typical system may have one or more controllers, such as a Battery Energy Control Module (BECM) 76 that monitors and controls the performance of the traction battery 24. The BECM 76 may monitor several battery pack level characteristics such as a pack current, pack voltage and pack temperature, for example. The BECM 76 may have non-volatile memory such that data may be retained when the BECM 76 is in an off condition. Retained data may be available upon the next key cycle.

In addition to the pack level characteristics, battery cell level characteristics may be measured and monitored. For example, the voltage, current, and temperature of each cell may be measured. A system may use a sensor module to measure the battery cell characteristics. Depending on the capabilities, the sensor module may measure the characteristics of one or multiple of the battery cells and transfer the measurements to the BECM 76 for further processing and coordination. In some embodiments, the sensor module functionality may be incorporated internally to the BECM 76.

Various embodiments measure, calculate or otherwise determine various characteristics, properties, and/or parameters of the battery pack to control operation of the battery pack and/or the vehicle 12. Quantities such a battery power capability and power demand from the battery 24 by one or more electric machines 14 may be monitored and controlled. Battery power capability and state of charge (SOC) may be used for controlling the operation of the battery pack during charging/discharging while the vehicle is operating as well as any electrical loads 60, 80 receiving power from the battery pack. Battery power capability provides an indication of the amount of power the battery can provide or the amount of power that the battery can receive or store. The battery power capability may be used to manage electrical loads such that the power requested is within desired limits for the particular battery or operating conditions. As described in greater detail herein, Battery pack state of charge (SOC) provides an indication of the amount of charge remaining in the battery pack. The battery pack SOC may be output or broadcast by the vehicle network to inform the driver of remaining charge and/or estimated travel distance, similar to a fuel gauge. The battery pack SOC may also be used to control the operation of an electric or hybrid-electric vehicle. Calculation of battery pack SOC can be accomplished by a variety of methods. One possible method of calculating battery SOC is to perform an integration of the battery pack current over time. This is well-known in the art as ampere-hour (or amp-hour) integration. One possible disadvantage to this method is that the current measurement may be noisy. Possible inaccuracy in the SOC may occur due to the integration of this noisy signal over time.

As generally illustrated in FIG. 1, in one or more embodiments, vehicle 12 includes a traction battery 24 having a first nominal voltage, such as a voltage exceeding 300V. Auxiliary battery 30 has a second nominal voltage, such as 12V, 24V, or 48V, for example, lower than the first nominal voltage of the traction battery 24. Bi-directional DC/DC converter 28 is configured to convert voltage associated with the traction battery 24 and the auxiliary battery 30 between the first nominal voltage and the second nominal voltage. Electric machine 14 powered by traction battery 24 is configured to provide propulsive power to vehicle 12. Controller 48 is programmed or configured to control the DC/DC converter 28 and the electric machine 14 to supply power from the auxiliary battery 30 through the DC/DC converter 28 to the electric machine 14 for a specified period of time in response to electric machine power demand being between a first threshold and a second threshold as illustrated and described in greater detail with reference to FIGS. 2 and 3. Controller 48 may be further configured to reduce power supplied to at least one of the electric accessories represented by HV electrical load 46 and LV electrical load 80 in response to the power demand of electric machine 14 exceeding the second threshold. In at least one embodiment, controller 48 is configured to reduce the power supplied to the electric air conditioning compressor 60 in response to the electric machine power demand exceeding the second threshold. In embodiments where vehicle 12 includes an internal combustion engine 18, controller 48 may be further configured to start internal combustion engine 18 in response to the power demand of electric machine 14 exceeding the first threshold, or in some embodiments, exceeding the second threshold. Controller 48 may also be configured to reduce power supplied by generator 70 in response to the power demand of electric machine 14 exceeding the second threshold.

Figure 2:
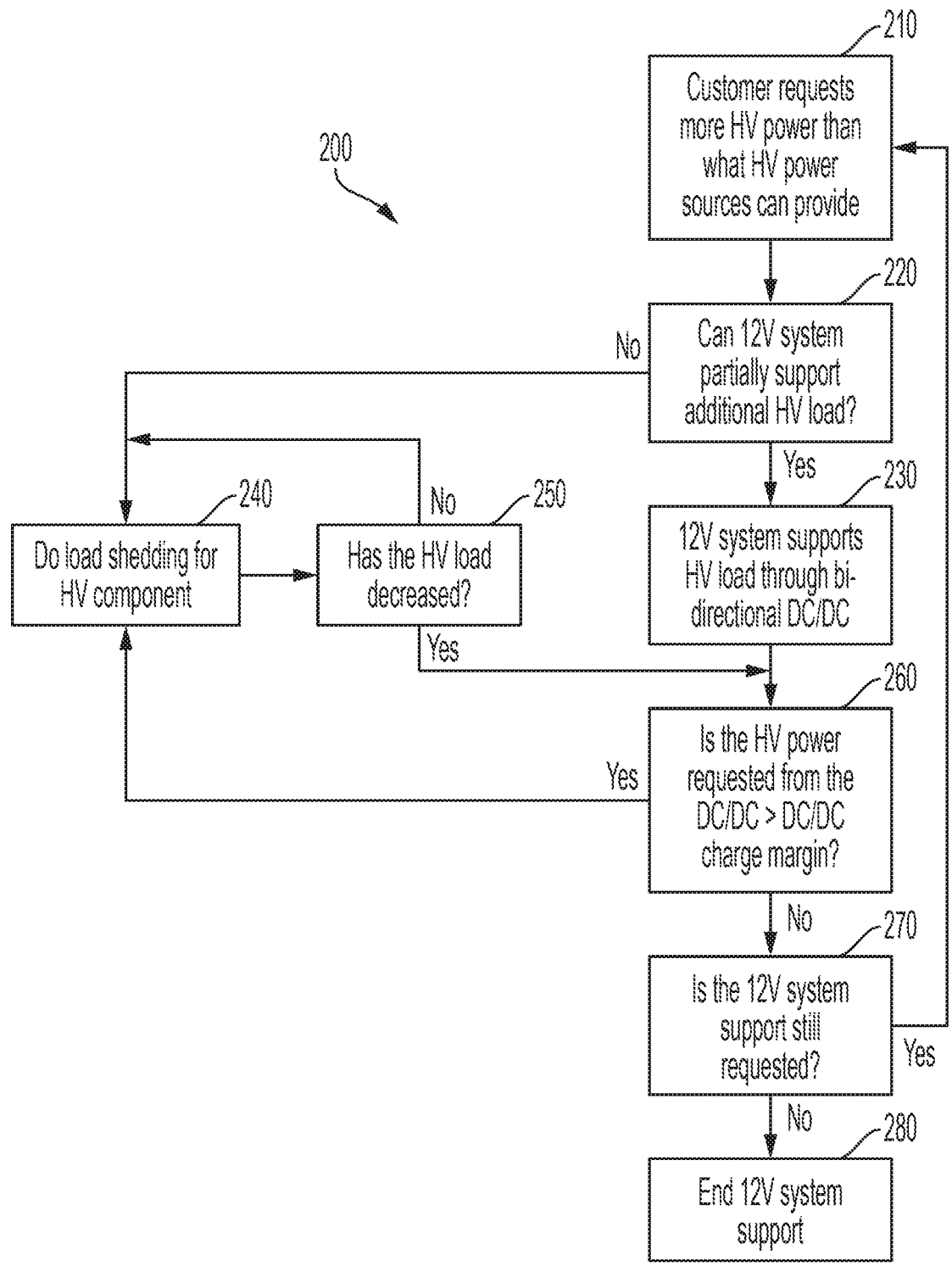
FIG. 2 is a block diagram illustrating operation of a vehicle or method/control strategy that provides power assist to a higher voltage system from a lower voltage system during high power demand.

FIG. 2 is a block diagram illustrating operation of a system or method for controlling an electrified vehicle according to various embodiments. The simplified block diagram represents an algorithm, control logic and/or program code for embodiments of a system or method for controlling an electrified vehicle to provide power assist from a low voltage electrical system to a high voltage electrical system. As will be appreciated by one of ordinary skill in the art, the diagram illustrated in FIG. 2 may represent any of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages associated with various embodiments of the claimed subject matter, but is provided for ease of illustration and description. The control logic may be implemented in software which is executed by a microprocessor-based controller. Of course, the control logic may also be implemented by various types of logic devices that may use software, hardware, or a combination of software and hardware.

Figure 3:
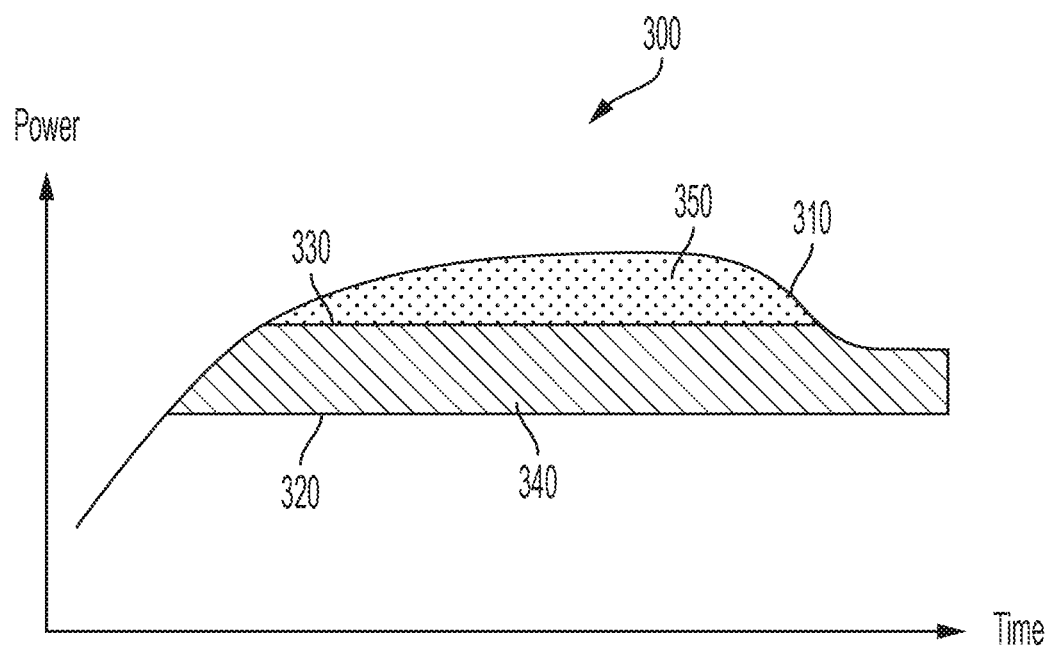
FIG. 3 is a graph illustrating power assist from a lower voltage system to a higher voltage system during high power demand to reduce/delay or eliminate load shedding.

FIG. 3 is a graph illustrating operation of a representative embodiment of an electrified vehicle or method for controlling a vehicle to provide power assist from a low voltage electrical system when power demand exceeds power available from HV sources.

With reference to FIGS. 2 and 3, system or method 200 includes monitoring power demand from the HV power sources to detect when the power demand exceeds power availability from the vehicle HV power sources as represented at 210. For example, if vehicle 12 is operating with electric machine 14 providing propulsive power in addition to supply power to HV electrical loads 46, such as an eAC 60, electric heater, etc. while subjected to a high road load situation, such as towing a trailer uphill, electric machine 14 may not be able to meet the HV power demands for the vehicle. HV power demand is represented in graph 300 of FIG. 3 by curve 310. When HV power demand exceeds available HV power as determined by block 210 and represented by first threshold 320, controller 48 determines whether the low voltage system can at least partially support the additional HV power demand as represented at 220. If yes, controller 48 controls the bi-directional DC/DC converter 28 to supply power from the LV system including auxiliary battery 30 and convert the LV power to HV power as represented at 230 to operate in region 340 between the first threshold 320 and the second threshold 330.

If the LV system has insufficient power availability to support the HV load as determined at 220, i.e. HV power demand exceeds the second threshold 330 so that the system is operating in region 350, then controller 48 may perform load shedding as represented at 240 by reducing power supplied to at least one electrical load 46, 80 as represented at 240. Additional reduction of power may be performed by selecting additional electrical loads to disable or reduce power as represented at 250 until the HV load has decreased below the second threshold 330. Alternatively, in at least one embodiment, controller 48 may start engine 18 using electric machine 14 to provide additional power in response to HV power demand exceeding the first threshold 320 to reduce/delay load shedding. Alternatively, or in combination, controller 48 may start engine 18 using electric machine 14 in response to HV power demand exceeding second threshold 330 to reduce the need for load shedding.

As also shown in FIG. 2, if the HV power demand exceeds the power available from the LV system as represented at 260, i.e. HV power demand exceeds the second threshold 330 after operating in region 350 with LV system support, then controller 48 may perform load shedding as represented at 240. Otherwise, block 270 determines whether the LV system support is still being requested based on the HV power demand. If yes, control returns to block 210. Otherwise, the LV system support is ended as represented at block 280.

Embodiments according to the disclosure may provide various advantages. For example, additional support of the LV electrical system using the bi-directional DC/DC converter increases the load shedding threshold such that load shedding is less likely to occur.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable and non-transitory storage media such as ROM devices and information alterably stored on writeable, non-transitory storage media such magnetic disks or tapes, solid-state memory or drives, CDs, RAM devices, flash memory and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery having a first nominal voltage;
   an auxiliary battery having a second nominal voltage lower than the first nominal voltage of the traction battery;
   a bi-directional DC/DC converter configured to convert voltage associated with the traction battery and the auxiliary battery between the first nominal voltage and the second nominal voltage;
   an electric machine powered by the traction battery and configured to provide propulsive power to the vehicle; and
   a controller configured to control the DC/DC converter and the electric machine to supply power from the auxiliary battery through the DC/DC converter to the electric machine for a specified period of time in response to electric machine power demand being between a first threshold and a second threshold.

2. The vehicle of claim 1 further comprising a plurality of electric accessories powered by at least one of the auxiliary battery and the traction battery, wherein the controller is further configured to reduce power supplied to at least one of the electric accessories in response to the electric machine power demand exceeding the second threshold.

3. The vehicle of claim 2 wherein the plurality of electric accessories comprises an electric air conditioning compressor, and wherein the controller is further configured to reduce the power supplied to the electric air conditioning compressor in response to the electric machine power demand exceeding the second threshold.

4. The vehicle of claim 3 further comprising an internal combustion engine, wherein the controller is configured to start the internal combustion engine using the electric machine in response to the electric machine power demand exceeding the first threshold.

5. The vehicle of claim 4 further comprising a generator mechanically coupled to the internal combustion engine, wherein the controller is configured to reduce power supplied by the generator in response to the electric machine power demand exceeding the second threshold.

6. The vehicle of claim 1 wherein the first nominal voltage exceeds 300V and the second nominal voltage is less than 50V.

7. A method for controlling a vehicle including an electric machine, a traction battery having a first nominal voltage, an auxiliary battery having a second nominal voltage, and a bi-directional voltage converter configured to convert voltage between the first nominal voltage and the second nominal voltage, the method comprising, by a vehicle controller:
   operating the bi-directional voltage converter to supply power from the auxiliary battery to the electric machine in response to electric machine power demand exceeding a first threshold; and
   reducing power supplied to at least one electrical load in response to the electric machine power demand exceeding a second threshold.

8. The method of claim 7 wherein the vehicle further includes an internal combustion engine, the method further comprising:
   starting the internal combustion engine in response to the electric machine power demand exceeding the first threshold.

9. The method of claim 8 wherein the first nominal voltage exceeds 300V and the second nominal voltage is less than 50V.

10. The method of claim 9 wherein the vehicle includes an electric air conditioning compressor and wherein reducing power supplied to at least one electric load comprises reducing power supplied to the electric air conditioning compressor.

11. The method of claim 9 wherein the vehicle includes a generator mechanically coupled to the internal combustion engine, the method further comprising reducing power supplied by the generator in response to the electric machine power demand exceeding the second threshold.

12. A vehicle comprising:
    a traction battery having a first nominal voltage;
    an auxiliary battery having a second nominal voltage lower than the first nominal voltage of the traction battery;
    a bi-directional DC/DC converter configured to convert voltage associated with the traction battery and the auxiliary battery between the first nominal voltage and the second nominal voltage;
    an electric machine powered by the traction battery and configured to provide propulsive power to the vehicle;
    an internal combustion engine;
    a plurality of electric accessories; and
    a controller programmed to control the DC/DC converter and the electric machine to supply power from the auxiliary battery through the DC/DC converter to the electric machine for a specified period of time in response to electric machine power demand being between a first threshold and a second threshold, and to reduce power supplied to at least one of the plurality of electric accessories in response to the electric machine power demand exceeding the second threshold.

13. The vehicle of claim 12 wherein the controller is further programmed to start the internal combustion engine in response to the electric machine demand exceeding at least one of the first and second thresholds.

14. The vehicle of claim 13 wherein the plurality of electric accessories comprises an electric air conditioning compressor.

15. The vehicle of claim 13 further comprising a generator mechanically coupled to the internal combustion engine.

16. The vehicle of claim 13 wherein the electric machine is configured to start the internal combustion engine.

17. The vehicle of claim 12 wherein the controller is further programmed to reduce power supplied to a sufficient number of the plurality of electric accessories to reduce the electric machine power demand below the second threshold.

* * * * *